United States Patent [19]
Bailey

[11] 3,718,540
[45] Feb. 27, 1973

[54] ELECTROLYTIC CELLS
[75] Inventor: Henry Philip Bailey, Fossway, England
[73] Assignee: International Research & Development Company Limited, Newcastle upon Tyne, England
[22] Filed: March 19, 1970
[21] Appl. No.: 126,057

[52] U.S. Cl. ............... 204/272, 204/260, 204/275
[51] Int. Cl. ............................................. C22d 1/02
[58] Field of Search .............. 204/149, 260, 272, 275

[56] References Cited

UNITED STATES PATENTS

| 2,997,430 | 8/1961 | Foyn | 204/272 |
| 3,527,617 | 9/1970 | Prober | 204/272 |
| 3,547,801 | 12/1970 | Paine | 204/272 X |
| 3,282,823 | 11/1966 | Richards | 204/272 |

FOREIGN PATENTS OR APPLICATIONS

| 236,958 | 3/1960 | Australia | 204/272 |

Primary Examiner—John H. Mack
Assistant Examiner—W. I. Solomen
Attorney—Kemon, Palmer & Estabrook

[57] ABSTRACT

An electrolysis cell for purification of water containing dissolved chlorides by generation of chlorine or hypochlorite consists of coaxial tubular anode and cathode defining an annular flow passage for the continuous flow of the electrolyte and the inlet passages to the annular passage are arranged to produce a swirling motion of the electrolyte around the axis of the anode in order to prevent blocking of the narrow annular passage by deposits.

14 Claims, 4 Drawing Figures

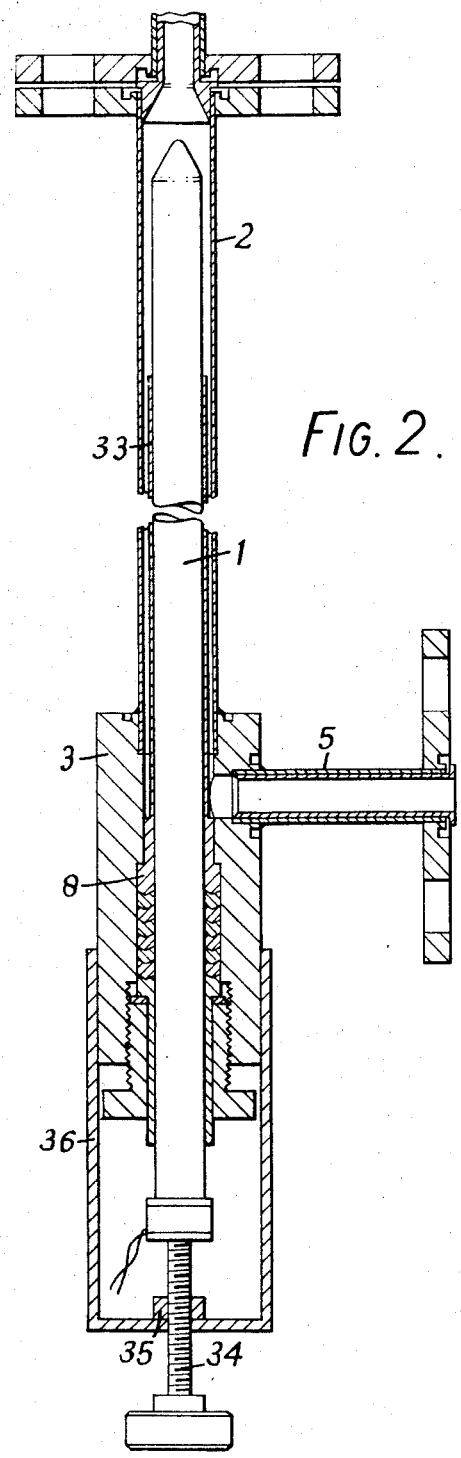
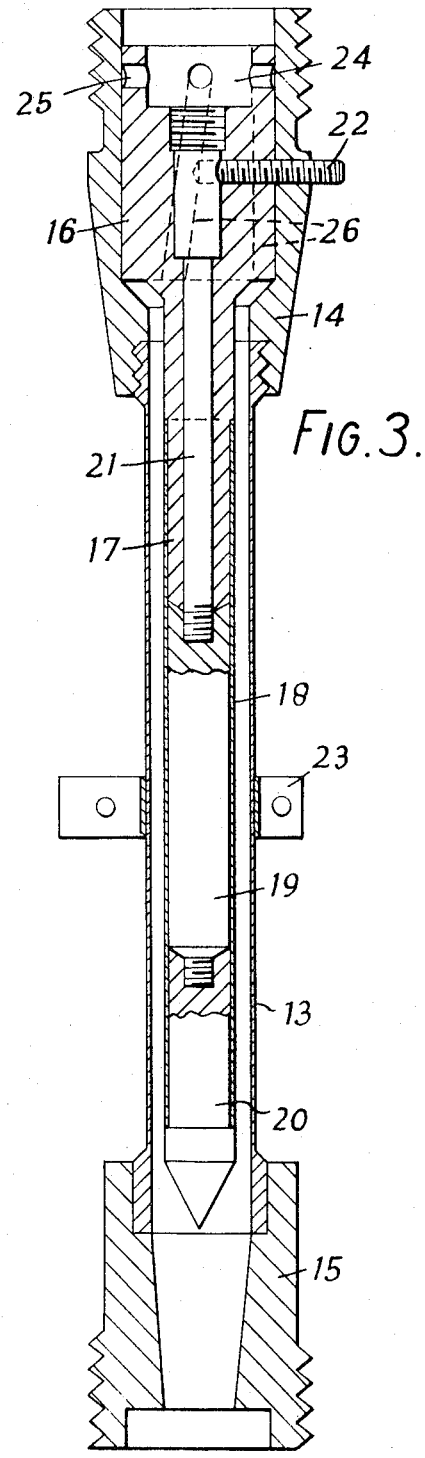

ELECTROLYTIC CELLS

The present invention relates to an electrolysis cell for the treatment of water containing dissolved chlorides to effect purification or sterilization of the water.

The passage of sea water through metallic pipes, heat exchanger tubes and the like can be rendered difficult owing to the phenomenon of biological fouling whereby living organisms present in the sea water attach themselves to the inside walls of the pipes or tubes and present an obstruction to the flow.

It is known that chlorine and certain chlorine derivatives when present in sea water can obviate biological fouling in otherwise susceptible conditions and it is further known to produce sodium hypochlorite solution for this purpose by electrolysis of sea water. Electrolysis cells used hitherto to electrolyze sea water, however, have suffered several disadvantages amongst which are the need to dismantle them frequently for maintenance, their sensitivity to the temperature of the electrolyte and their general bulkiness.

Such a method of water treatment and purification by chlorination resulting from electrolysis of dissolved chlorides is also applicable to common salt solutions and generally to fresh water which contains dissolved chlorides which are present naturally or in consequence of the use of the water or have been added specifically for the purpose of chlorination.

In accordance with the present invention there is provided an electrolysis cell for treatment of water containing dissolved chlorides comprising at least one unit having a tubular cathode, an elongate anode disposed co-axially within the cathode to define an annular flow passage between the anode and the cathode, at least one inlet passage communicating with one end of said annular flow passage and an outlet passage communicating with the other end of said annular flow passage, each inlet passage being arranged to produce a swirling motion of the electrolyte in the said annular flow passage.

Such a cell is useful for purifying the water of swimming pools, to which if necessary additional chlorides can be added in the form of common salt. Other applications of the invention are to the treatment of water in oceanaria and to the treatment of sewage, especially in ships bilges which require purification of the water before it can be discharged from the ship.

The invention will now be described in more detail with the aid of examples illustrated in the accompanying drawings, in which:

FIG. 2 is cross-section of a modified form of the electrolysis cell of FIG. 1,

FIG. 3 is a cross-section of a further form of electrolysis cell in accordance with the invention.

Figure 1:
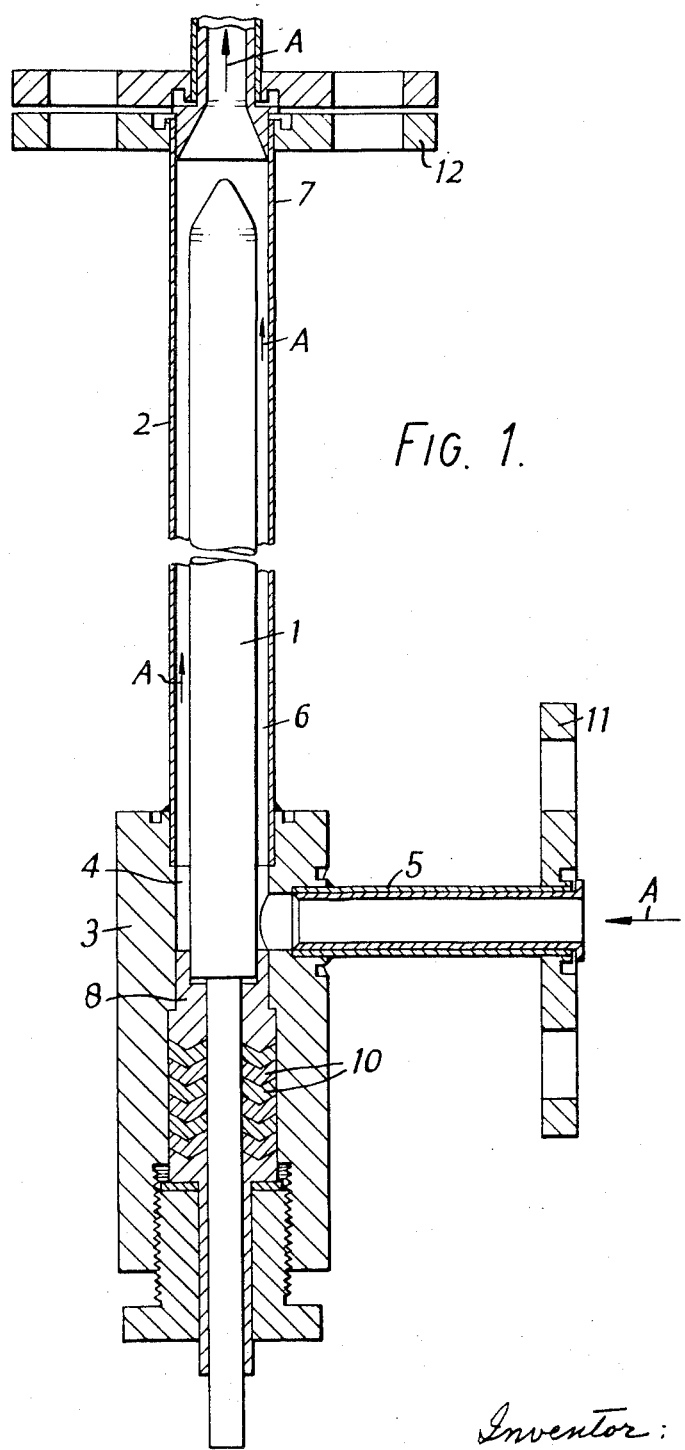
FIG. 1 is a cross-section of an electrolytic cell in accordance with the invention.

The water to be electrolyzed, containing dissolved chlorides, is passed through the cell shown in FIG. 1 in the direction of the arrows A. The cell comprises a rod-shaped anode 1, a cylindrical tubular cathode 2, a hollow member 3 serving to support the anode 1 and the cathode 2 and also forming a wall for a chamber 4, and an inlet tube 5 through which the electrolyte enters the cell. Electrolyte entering the cell passes through the tube 5, enters first the chamber 4, then flows through an annular space 6 provided between the anode and cathode, finally leaving the cell at the upper end 7 of the cathode. The electrolyte is electrolyzed as it passes between the anode and the cathode, which are connected to a supply circuit by leads which are not shown in the drawing.

The anode 1 is composed of platinum or platinum alloy, in this case platinum-rhodium alloy, and is in the form of a hollow rod or tube of solid, that is un-coated, material. Alternatively the material of the anode may be an alloy including some other noble metal, such as indium. The tubular cathode 2 is composed of titanium or some other corrosion-resistant material such as 18/8 stainless steel. If the cell is required to operate on alternating current supplies the cathode can be composed of tantalum, which has a rectifying action in contact with the electrolyte. This rectifying action which results from the presence of an anodically formed oxide coating can also be obtained with other so-called valve metals such as hafnium and aluminum.

The hollow member 3 and the inlet tube 5 are both preferably composed of titanium but an insulating sheath is placed over the inner surface of the tube 5 to avoid electrolytic action in this region. One end of the anode 1 is supported in the chamber 4 by a support member 8 which electrically insulates the anode from the member 3. The member 8 is held within the member 3 by a threaded closure member 9 and packing or sealing rings 10 which prevent leakage of electrolyte. The member 8 is formed of polycarbonate resin and the rings 10 may be formed of polytetrafluoroethylene.

Flanges 11 and 12 are provided at the ends of the tube 5 and the cathode 2, respectively, to couple the cell to inlet and outlet piping.

Referring now to FIG. 2, the cell shown is similar to that shown in FIG. 1, but differs in that an electrically insulating sheath 33 is provided which closely surrounds the anode for a portion of its length. The sheath may be connected to or integral with support member 8 and is preferably formed of polycarbonate.

A screwed rod 34 forming an extension of anode 1 is provided to enable the position of the anode to be adjusted axially with respect to member 8 and sheath 9, the rod 34 engaging a nut 35 supported by member 3 by way of a support bracket 36. The length of the unsheathed portion of anode 1 may thus be adjusted in order to permit the use of the cell with different current flows for a given applied potential difference between the anode and cathode.

Whilst in both forms of apparatus shown in accordance with the invention inlet tubes 5 enter member 3 in a direction which is inclined at 90° to the mutual axis of anode 1 and cathode 2, the invention is not restricted to cells having such a direction of entry, and the axis of tube 5 may alternatively be directed obliquely with respect to the mutual axis of the anode and cathode.

The axis of tube 5 as well as being inclined to the mutual axis of the anode and cathode is offset from this axis in order to produce a swirling motion of the electrolyte flowing through the annular space 6 about the axis of the anode.

A temperature sensitive resistor, preferably a positive temperature coefficient resistor, may be incorporated in the cell to monitor the temperature of the cell and break the current supply to the cell should its temperature rise rapidly due, for example, to a severe reduction or stoppage of the flow of electrolyte through the cell. Where a hollow anode is used, the temperature sensitive resistor may conveniently be situated within the anode.

Referring now to FIG. 3, the cell shown has a cathode tube 13 of titanium which extends between an inlet member 14 and an outlet member 15. A body 16 is mounted in the inlet member 14 and has a spigot 17 which projects co-axially within the cathode tube 13. The inlet member 14, the outlet member 15, and the body 16 with its integral spigot 17 are all made of polycarbonate synthetic resin. A platinum alloy anode tube 18 is fitted over the spigot 17 and extends coaxially with the cathode tube 13 over substantially the whole length thereof. A solid brass cylinder 19 fits closely within the central part of the length of the anode tube 18 and the end nearest the outlet is closed by a plug 20 of insulating polycarbonate material.

The plug 20 is screwed onto the end of the brass cylinder 19, which in turn is screwed to the end of a brass rod 21 which is seated with the body 16 and extends through the spigot 17. The upper end of the bore containing the rod 21 is closed by a screw-threaded plug 21A of insulating material. A screwed rod 22 extending through the wall of the inlet member 14 and through the body 16 and engaging in the head of the rod 21 provides an external electrical connection for the anode tube 18. The cathode connection is made to a bracket 23 which is fitted on the cathode tube 13.

The outer end of the body 16 has a recess 24 from which bores 25 extend radially outwards to grooves 26 in the surface of the body. The grooves 26 open into the space between the inlet member 14 and the spigot 17 and feed the water to be electrolyzed into the passage between the anode and cathode tubes. The grooves 26 are inclined to the axis of the tubes 13 and 18 and thus create a swirling motion of the water in the space between the tubes. This helps to keep the surfaces clean and remove gas bubbles forming on the surface during the electrolysis.

In the construction of FIG. 3 the anode tube 18 is a thin-wall tube of platinum-rhodium alloy and is supported by the spigot 17, the cylinder 19, and the plug 20, all of which fit closely within the tube 18 and are firmly secured together. The length of the tube 18, which determines the effective length of the cell, is about 4 to 5 inches and the gap between the anode and the cathode is less than 0.1 inch. For sea-water a gap of 0.08 inch is preferred but for water with lower concentrations of salt the gap may be reduced to, say, 0.04 inch. Because of the risk of blocking of this small gap with precipitated material the swirling motion of the electrolyte is very important.

Figure 4:
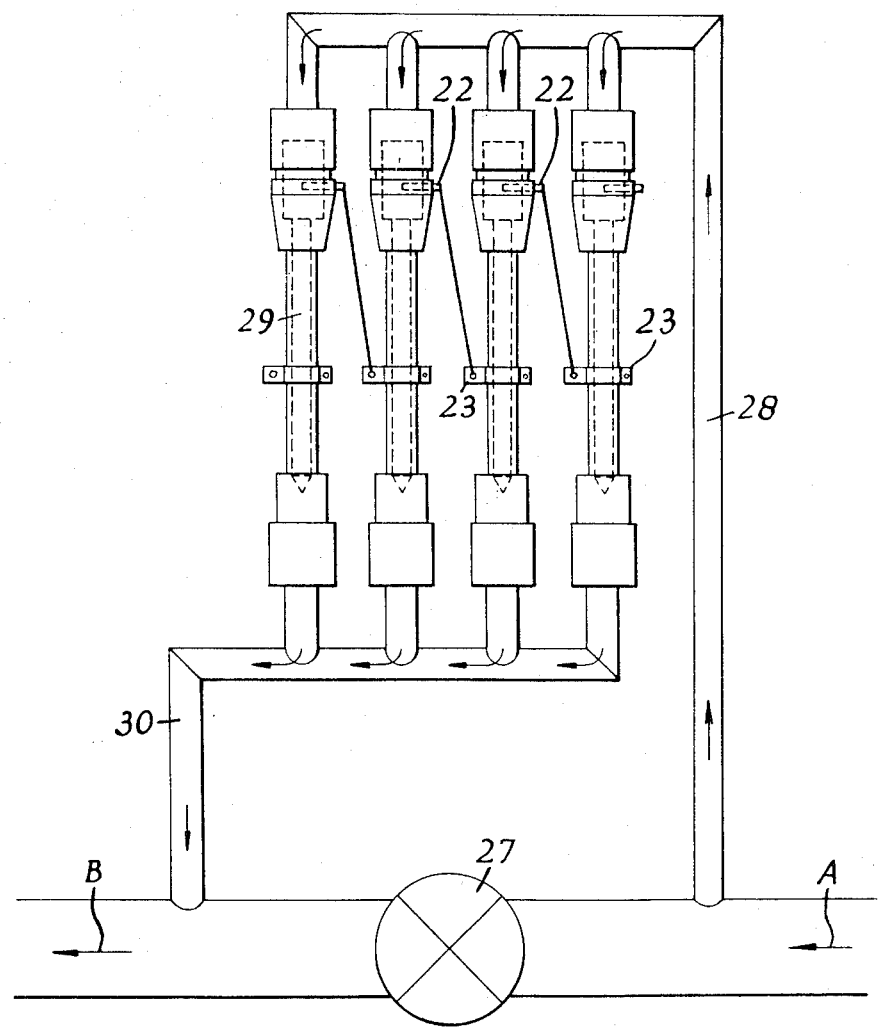
FIG. 4 is a diagram of apparatus for purification of the water in a swimming pool incorporating a number of electrolysis cells of the form shown in FIG. 3.

FIG. 4 shows apparatus for treatment of the water in a swimming pool using four of the cells shown in FIG. 3. The water from the pool is passed through a filter and enters the apparatus shown in the drawing at A. The water leaving the apparatus at B is returned to the pool. A flow-reducing valve 27 controls the flow of water from A to B, so that a fixed proportion flows by way of a conduit 28 to the four electrolytic cells 29 which are branched in parallel from the conduit 28 and feed chlorinated water by a common conduit 30 back into the flow of water being returned to the pool. As shown in FIG. 4, the cells 29 are electrically connected in series, the cathode connection bracket 23 of one being connected to the anode connection rod 22 of the next. As a result of the electrolysis of the dissolved chlorides in the water, principally sodium chloride, extra quantities of which can be added to the water if required, there if formed sodium hypochlorite which acts to neutralize biological contaminants in the water.

The apparatus can be operated continuously and automatically. The power consumption is low and the time required for maintenance is small. Only a proportion of the water is passed through the electrolysis cells at any one time but this provides adequate chlorination for the whole of the water in the pool. Instead of keeping the apparatus in operation all the time it can, if desired, be switched on only for, say, 12 hours a day.

I claim:

1. An electrolytic cell, for treatment of water containing dissolved chlorides, comprising: at least one unit having a tubular metal cathode; an elongate tubular anode of un-plated metal disposed coaxially within said cathode to define an annular flow passage therewith; an insulating support block mounting said anode within said cathode; an insulating spigot on said support block fitting within one end of said anode; an electrically conducting rod passing through said spigot and said support block and electrically connected at one end with said anode; at least one inlet passage communicating with one end of said annular flow passage; and an outlet communicating with the other end of said annular flow passage, each inlet passage being arranged to produce a swirling motion of the electrolyte in the said annular flow passage.

2. An electrolysis cell as claimed in claim 1 in which the cathode is composed of a metal which has a rectifying action in contact with the electrolyte whereby an alternating voltage may be applied to the cell.

3. An electrolysis cell as claimed in claim 1 in which the anode is a tubular member.

4. An electrolysis cell as claimed in claim 1 in which each inlet passage is inclined to and offset from the axis of the anode whereby to produce said swirling action.

5. An electrolysis cell as claimed in claim 4 in which each inlet passage is inclined at 90° to the axis of the anode.

6. An electrolysis cell as claimed in claim 1 in which the anode is of platinum-rhodium alloy.

7. An electrolysis cell as claimed in claim 6 in which the cathode is of titanium.

8. An electrolysis cell as claimed in claim 1 in which the inlet passage is disposed in a plane perpendicular to the axis of the anode and is offset from the said axis.

9. An electrolysis cell as claimed in claim 8 having a hollow member supporting one end of the cathode, one end of the anode being supported with a chamber formed by the said hollow member, and the inlet passage extending into the said chamber through a side wall thereof.

10. An electrolysis cell as claimed in claim 9 having an electrically-insulating sheath surrounding a part of the axial length of the anode and means for adjusting the anode axially relative to the sheath.

11. An electrolysis cell as claimed in claim 1 in which said support block has a plurality of inlet passages inclined to the axis of the anode.

12. An electrolysis cell as claimed in claim 11 having an electrically conducting cylinder block fitting within said tubular anode, the said one end of the electrically conducting rod being coupled to said cylinder.

13. An electrolysis cell as claimed in claim 12 having a tubular inlet member attached to one end of the cathode, the support block fitting within the tubular inlet member, and an electrically conducting pin passing through the inlet member and the support block to secure the support block in the inlet member and engaging the said rod to form an anode terminal.

14. An electrolysis cell as claimed in claim 12 having an electrically insulating plug disposed within the end of the tubular anode remote from the spigot and coupled to the electrically conducting cylinder.

* * * * *